Dec. 22, 1959  D. R. KNOX ET AL  2,918,100
TUBE BENDING APPARATUS
Filed March 29, 1954  6 Sheets-Sheet 1

INVENTORS
DAVID R. KNOX &
STANLEY GONDEK.
BY Barnes, Kisselle, Laughlin & Raisch
ATTORNEYS.

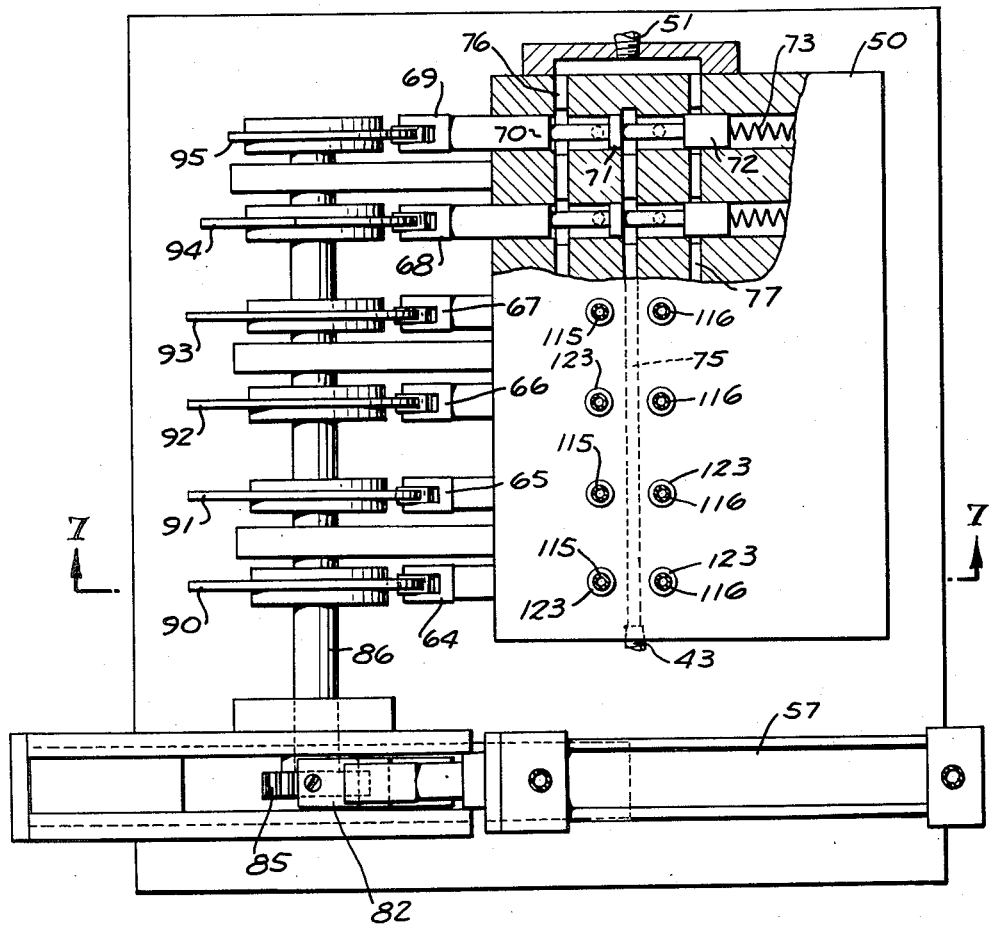
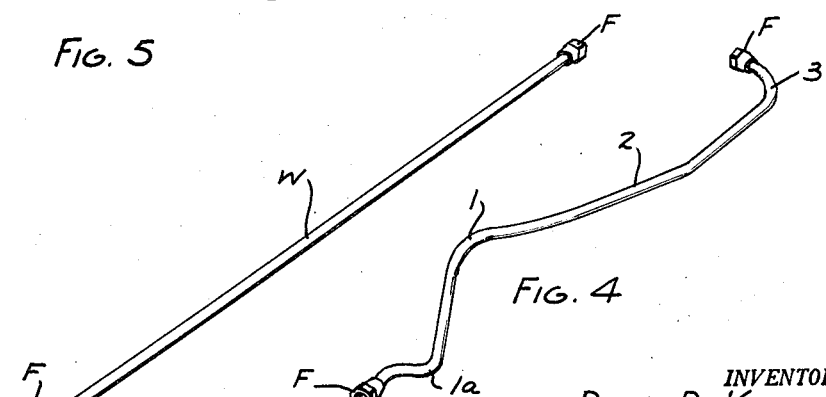

INVENTORS
DAVID R. KNOX &
STANLEY GONDEK.
BY

ATTORNEYS.

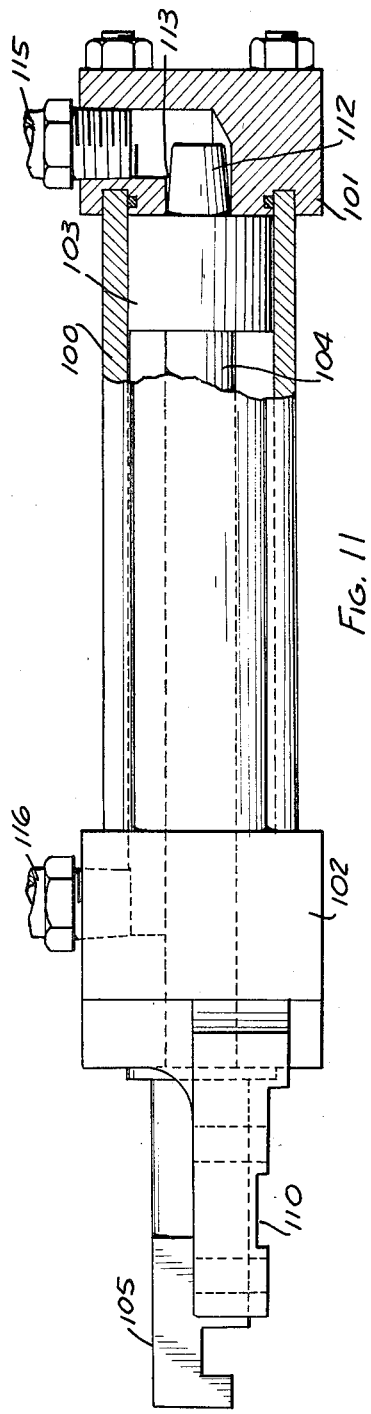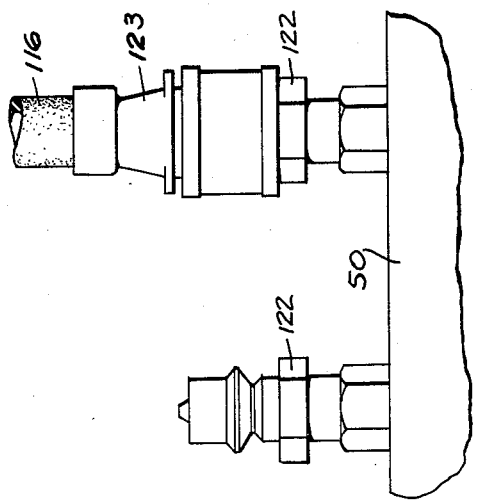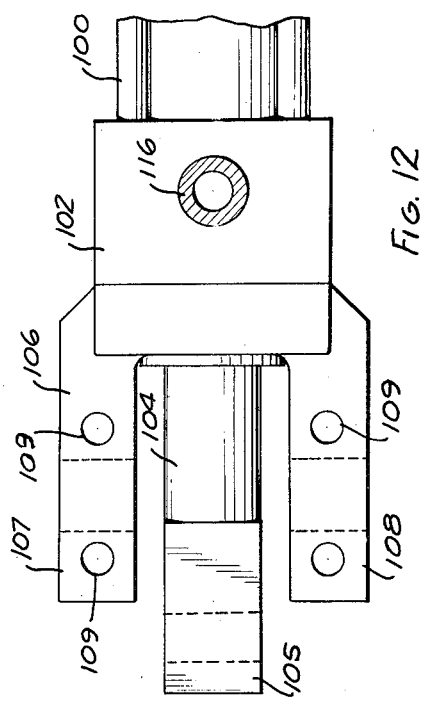

Dec. 22, 1959  D. R. KNOX ET AL  2,918,100
TUBE BENDING APPARATUS
Filed March 29, 1954  6 Sheets-Sheet 5

INVENTORS
DAVID R. KNOX &
STANLEY GONDEK.
BY Barnes Kisselle Laughlin & Raisch
ATTORNEYS.

Dec. 22, 1959     D. R. KNOX ET AL     2,918,100
TUBE BENDING APPARATUS
Filed March 29, 1954     6 Sheets-Sheet 6
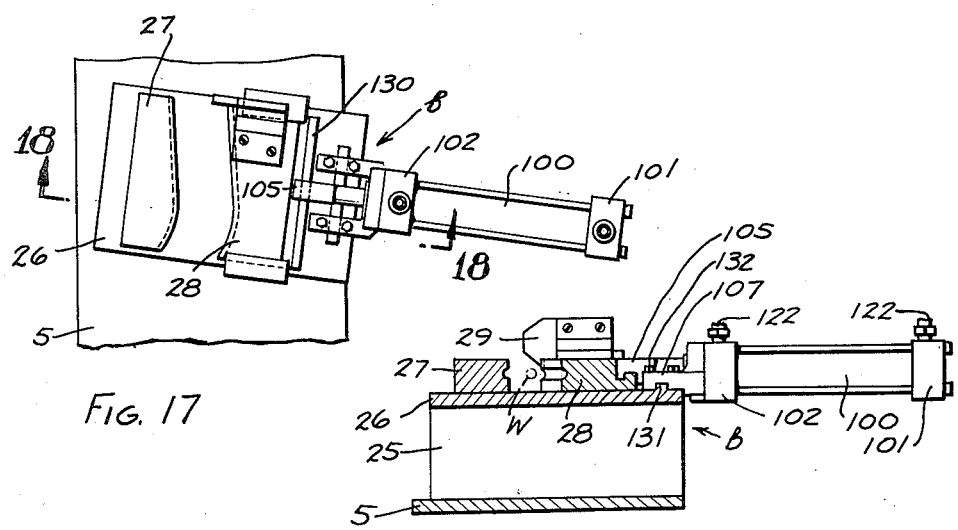
Fig. 17
Fig. 18
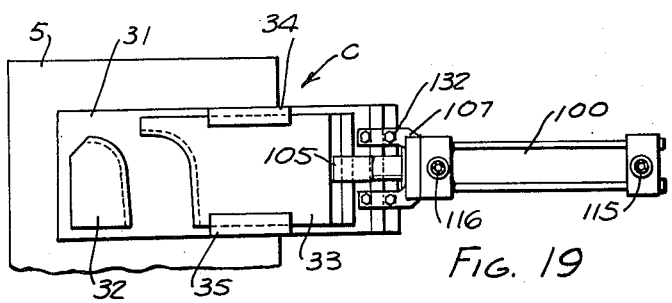
Fig. 19
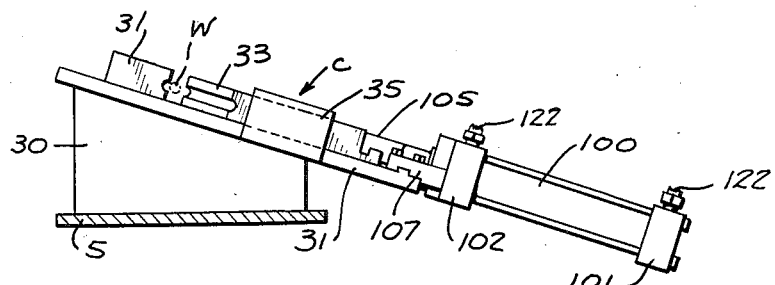
Fig. 20
INVENTORS
DAVID R. KNOX &
STANLEY GONDEK.
BY Barnes, Kisselle, Laughlin & Raisch
ATTORNEYS.

United States Patent Office 2,918,100
Patented Dec. 22, 1959

2,918,100

TUBE BENDING APPARATUS

David R. Knox, Huntington Woods, and Stanley Gondek, Detroit, Mich., assignors to Bundy Tubing Company, Detroit, Mich., a corporation of Michigan Application March 29, 1954, Serial No. 419,486

2 Claims. (Cl. 153—48)

This invention relates to the bending or fashioning of tubing and it has to do particularly with a system for performing bending operations by power operated means.

In many different kinds of machines, apparatus and other mechanisms, tubing is employed for conducting fluids such, for example, as gasoline lines, oil lines, lubricating lines and vacuum lines for automotive vehicles, refrigerant conducting lines for refrigerating mechanism, including lines associated with the evaporator, the condenser and with the compressing mechanism, fuel conducting lines for oil and gas burners, such as heating equipment and ranges, lubricating lines for machine tools, and conduits, pressure lines and vacuum lines for a variety of other machines and devices.

In many instances the mechanical and structural parts of the machine and apparatus are designed first, and then the various tubes or conduits are designed as to shape in order to fit into the mechanical and structural features. For example, an automotive vehicle as designed and then a length of tubing is designed as to shape and length to extend from the fuel tank to the engine or the pump therefor. The tubing is often designed as to shape so that it has numerous bends to lie properly with respect to the frame and other structural parts, and to pass around structural and mechanical parts. As a result, the manufacturer of tubing is called upon to supply a length of tubing pre-shaped to be quickly and easily fitted into position so that its ends accurately connect to the parts involved, such as a fuel tank and a fuel pump of an automotive vehicle. This has heretofore required much hand labor in operating bending fixtures to form and shape the tube as required. Some of the bends and shapes are quite complicated. Reference is made to tubing of fairly small size, in the vicinity of 3/16" to 5/8" in diameter and to tubing made of metal such as steel so that it is capable of retaining the shape given to it.

It is an object of this invention to provide an apparatus for bending tubing by power. There are so many shapes required that it is not economically feasible to design, build and equip a bending fixture with power means for each different product. Accordingly, the present invention aims to provide the actual bending fixtures as a separate unit and to provide power means which can be quickly and easily attached to and detached from the bending fixtures. In carrying out this invention the power means is constituted by a fluid power system and preferably a hydraulic system having a fixed location in a plant and which embodies a plurality of motors connected into the system by flexible conduits. Any one of a number of fixtures may then be properly located with respect to the power system, the motors quickly attached thereto and the system is ready for operation. When a different product is to be made, that is, a length of tubing of different size and shape and length and different bends, the fixture at the hydraulic power means is removed and another fixture is properly placed with reference to the system and quickly connected thereto.

The invention is disclosed in the accompanying drawings wherein:

Fig. 3 is a view of a straight length of tubing.

Fig. 4 is a view of the tubing fashioned into the desired product.

Fig. 5 is a plan view partly in section showing a controlling valve unit.

Fig. 11 is a view partly in section of one of the hydraulic motors.

Fig. 12 is a broken view looking at the top of the motor shown in Fig. 11.

Fig. 17 is a plan view of another bending device.

Fig. 18 is a sectional view taken substantially on line 18—18 of Fig. 17.

Fig. 19 is a plan view showing a further bending device.

Fig. 20 is a view partly in section and illustrating the bender of Fig. 19 in side elevation.

Fig. 21 is a view illustrating a hydraulic coupling showing detached and attached conditions.

The length of tube selected for illustration herein is illustrated at W in Fig. 3 and it is shown with fittings F at its ends. The tube is shaped into a finished product, as shown in Fig. 4, having a bend 1, another bend 1a, a bend formation as at 2, and a bend near one end as at 3. Only a small portion of the original work piece remains unbent. This work piece was selected because it is fairly simple in form with bends which do not have angles relative to each other which are difficult to show. As a result, a reasonably simple fixture is shown.

Figure 1:
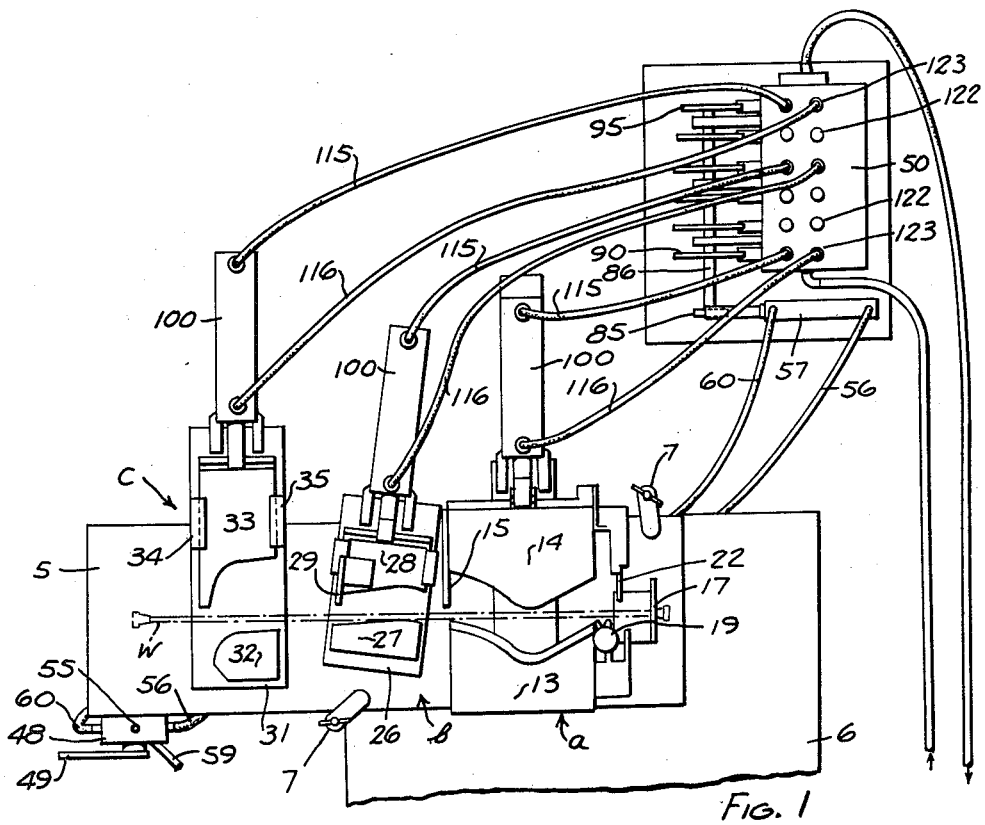
Fig. 1 is a plan view illustrating a fixture for bending a length of tubing and showing the same connected to the hydraulic power system.

The fixture as illustrated in Figure 1 is provided with a base 5 adapted to be mounted upon and attached to a suitable supporting table 6 which can be done by suitable clamps 7. The base supports several bending devices and the work piece may be inserted therein as indicated in Fig. 1.

The bending fixture has one bending unit a mounted on the base 5 and this is shown in Figs. 13 to 16. The unit a has a supporting plate 10 carried by a support 11 and positioned angularly relative to the horizontal (Fig. 14) and it has a fixed bending element or former 13. It has a slidable bending element or former 14. Both elements are grooved as shown to receive the tube and the slidable element is guided for movement by a guide 15. The unit a also has a hook shaped locator 17 in which the work piece W is disposed (Fig. 16) and an angularly disposed grooved former 19 with guide elements 20 and 21 leading to its groove. The former 19 and guide elements 20 and 21 are fixed, and mounted upon the sliding former 14 is an element 22 with an inclined or cam surface 23 with an overhanging piece 24.

When the tube is located as shown in Fig. 1 by positioning with respect to member 17 and the former 14 moves toward the former 13 the bend 1 is made in the work piece. As the bend 1 is made the end of the tube at 1a swings out of the locating member 17 and then the advancing cam surface 23 engages the end of the tube and shapes it into the grooved former 19 thus forming bend 1a. The path of movement of this end of the tube is generally shown by the arrows in Fig. 16. It will be noted that this forming unit is disposed at an angle to the horizontal so that the bend 1 is not only formed laterally but angularly downwardly and the bend 1a is formed so that the extreme end of the tube extends slightly angularly upwardly.

The unit b is supported by a member 25. This unit sits horizontally but is angularly disposed with reference to the support 5 as shown in Fig. 17. This unit b has a fixed plate 26, a fixed former 27 with a grooved face, and a sliding former 28 with a grooved face. It also has a guide member 29 for insuring that the work piece W is guided into the grooves of the formers 27 and 28. When the former 28 moves toward the fixed former 27 the bend 2 is placed in the work piece. The bending unit c (Figs. 19 and 20) is mounted on the support 5 by a supporting element 30 and this bending unit, while positioned at right angles to the support 5, is disposed at an angle to the horizontal and somewhat upwardly, so to speak, as distinguished from the downward angle as at a. It has a fixed plate 31 and a fixed former 32, and a sliding former 33 in guides 34 and 35. When the former 33 moves toward the former 32 the bend 3 is made in the work piece and this end of the work piece is not only bent laterally but also given an upward angle.

In the general operation of the fixture the work piece is located as illustrated in Fig. 1, and the several units operate in sequence. The unit a is first to operate and then the unit b and then the unit c. A proper sequence is worked out for this fixture as is the sequence for any other fixture as might be employed with the power means. After the work piece is bent, the moving elements of the units shift back to open position as shown in Fig. 1 and the finished product is removed.

Figure 2:
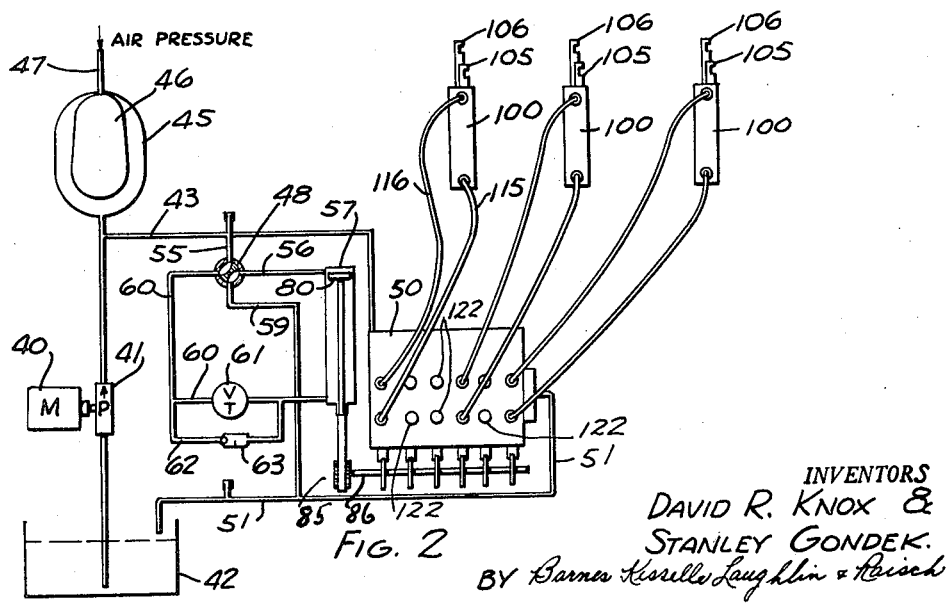
Fig. 2 is a diagrammatic view of the hydraulic system.
Figure 6:
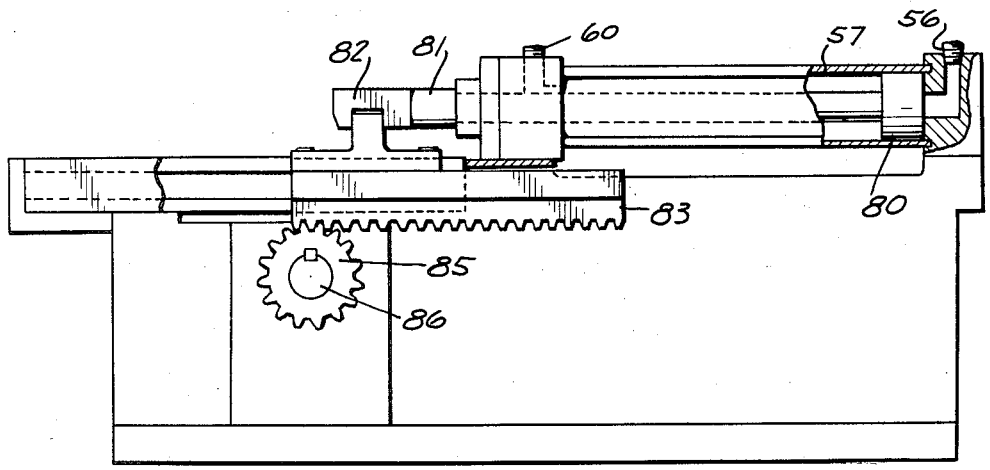
Fig. 6 is a view of a valve operator.

The power means, shown as a hydraulic system is diagrammatically shown in Fig. 2. A hydraulic system is preferred over a compressed air system because higher pressures can be used and therefore smaller motors which are more readily manipulated. A suitable motor 40 operates a pump 41 to pump hydraulic medium, such as a suitable oil, from a sump 42 into the high pressure line 43. The high pressure line is advantageously equipped with an accumulator, shown as being in the form of a vessel 45 into which the oil is pumped and within the vessel is an expandible and contractible sealed container 46 held under air pressure from a suitable source 47. Thus pressure compresses the air in the container 46 which expands upon a reduction of pressure and thus a substantially uniform pressure and a reserve supply of hydraulic medium is furnished for the pressure line 43. The pressure line 43 extends to a valve box 50 and a return line 51 conducts exhausted hydraulic medium back to the sump 42.

The valve box 50 contains several control valves. Line 55 connects into the pressure line 43 and to a four-way valve 48. The control valve 48 has an operating handle 49. The control valve is shown as manually operated but it may be operated through remote means if desired. Leading from the four-way valve, which is a control valve, is a line 56 which extends to a cylinder 57. A line 59 extends from the four-way valve to the return line 51. Also, leading from the control valve is a line 60 which extends to the opposite end of cylinder 57 and which has a variable throttle valve 61 therein. A by-pass line 62 extends around a throttle valve and it is provided with a check valve 63. The valve box 50 shown in detail in Fig. 5, has a plurality of reciprocable valve members 64, 65, 66, 67, 68, and 69. They may all be of identical construction, each having a land 70, a land 71 and a land 72 and each acted on by a coil spring 73. The pressure line 43 connects into a central pressure passage 75 while the return line 51 connects into return passages 76 and 77.

Figure 7:
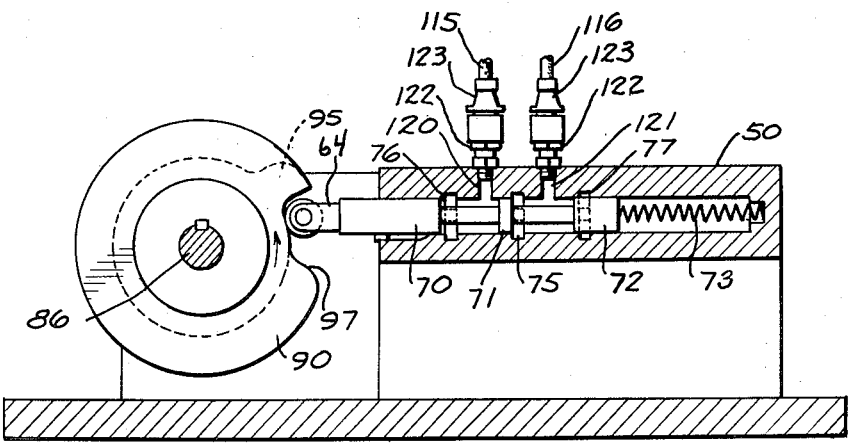
Fig. 7 is a view partly in section showing a control valve and its operating cam.
Figure 9:
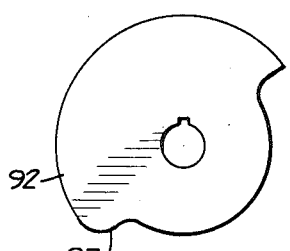
Figs. 8, 9 and 10 are elevational views of valve operating cams.
Figure 10:
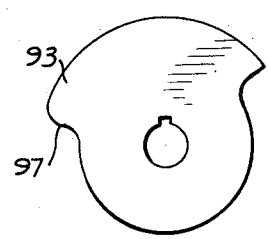
Figure 8:
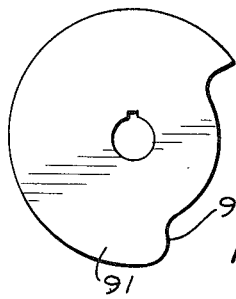

The valves are operated by a piston 80 in cylinder 57, the piston rod 81 of which is connected as at 82 to a gear rack 83 co-operating with a gear 85 mounted on a shaft 86. A plurality of cams are mounted on the shaft 86. There is a cam 90 for the valve 64, a cam 91 for the valve 65 and cams 92, 93, 94 and 95, for the other respective valves. The cams are arranged to operate the valves in sequence and to this end the cams as shown in Figs. 7, 8, 9 and 10 have their lift faces 97 progressively circumferentially spaced from each other. Considering that the operating direction of rotation of the shaft 86, as Fig. 7 is viewed, is counter-clockwise, the lift face of the cam 90 is first to function to operate the valve 64 followed in sequence by the lift faces of the cams 91, 92, 93, 94 and 95.

The valve box is connected to the several hydraulic motors for operating the various units of a fixture. Each hydraulic motor is shown herein as being in the form of a cylinder 100, with an end head 101 and an end head 102. However, motors with a rotary movement may be employed. Within the cylinder is a piston 103 and a piston rod 104 extends out through the head 102 and it has on its end a hook shaped attaching device 105. The cylinder of the motor is of a rigid unit construction and the head 102 is provided with attaching means shown herein as in the form of a yoke 106 having an arm 107 and an arm 108, both provided with bolt holes 109 and both conveniently provided with a groove 110. Each cylinder 100 is connected to the valve box by flexible hydraulic hose, the flexible hose 115 connecting into one end of the cylinder (Fig. 11) and the hose 116 connecting into the head 102 at the opposite end of the cylinder. The piston 103 advantageously has a projecting plug 112 which serves to throttle the port 113 to decelerate movement of the piston on its return stroke as will presently be seen. The valve box has two passages associated with each valve member as indicated at 120 and 121 in Fig. 7. These passages are equipped with couplings 122 each for receiving a quickly detachable coupling 123. The couplings 123 are mounted on the ends of the hydraulic hose 115 and 116. As shown in Fig. 21, one coupling 123 is detached from a coupling 122 and when detached it is closed. When the coupling 123 is attached the hydraulic line is open. Hydraulic couplings of this type are available and the particular construction thereof forms no part of this invention. To insure proper connection of the lines, the hoses 116 may be equipped with the female couplings 123, and the hoses 115 may be equipped with the male couplings, 122, or vice versa with corresponding change of the fittings on the valves.

As illustrated in Figs. 5 and 7, when a valve is in the position shown, the hydraulic pressure in the passage 75 passes into the valve chamber between the lands 71 and 72 and is thence conducted to the conduit 116 and to the return end of the cylinder 100. The opposite end of the cylinder 100 is connected between the lands 70 and 71 to the exhaust line 76. If a valve be shifted to the right the land 70 closes the exhaust line 76; the land 71 moves to the opposite side of the passage 75 so that pressure enters the line 115. At this time the land 72 opens the exhaust line 77 and the conduit 116 is connected to the exhaust line 77. The operation of the cams shifts the valves to the right and the springs 73 return the valves to the left hand position.

Figure 13:
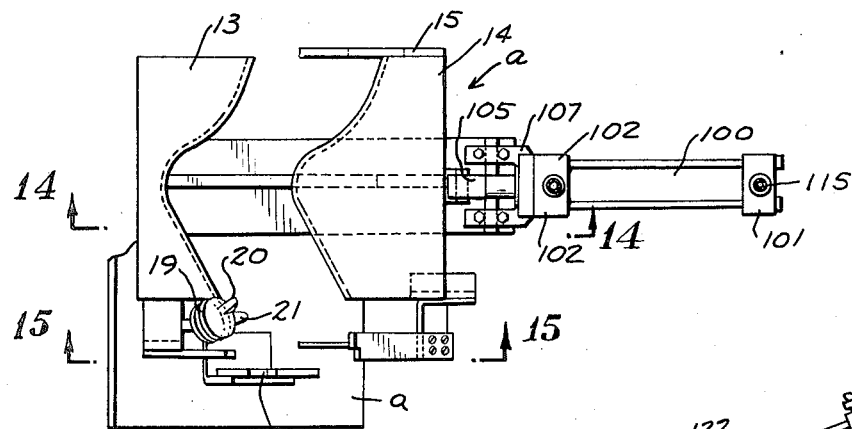
Fig. 13 is a plan view illustrating one of the bending devices of the fixture for bending a tube shown in Fig. 4.
Figure 14:
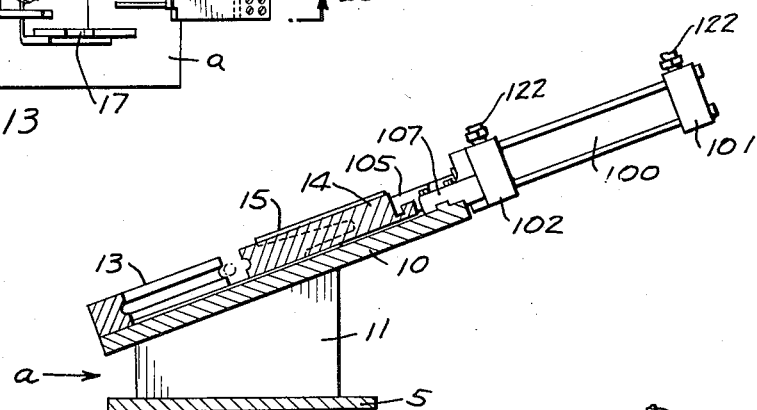
Fig. 14 is a sectional view taken substantially on line 14—14 of Fig. 13.
Figure 15:
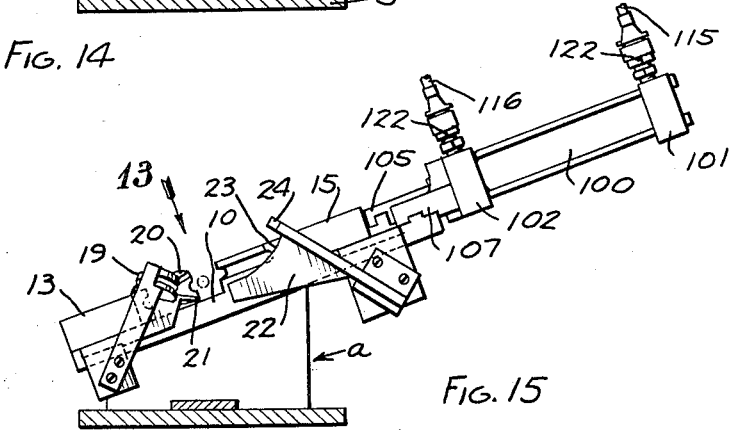
Fig. 15 is a view partly in section taken substantially on line 15—15 of Fig. 13.
Figure 16:
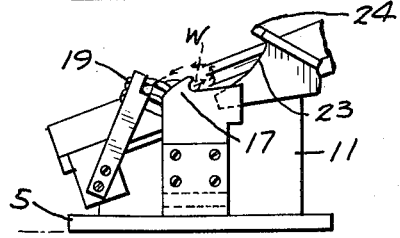
Fig. 16 is a view similar to Fig. 15 showing the parts in a different position.

The cylinders 100 are to be mounted with respect to their units as indicated in Figs. 13 and 18, for example. The connector elements 105 are hooked onto an upstanding rib or flange 130 on the movable former and the yoke 107 is mounted on a fixed plate or support the same being located by a rib 131 fitting into the groove 110 with the yoke bolted in position by bolts 132.

In operation, a fixture such as the fixture shown in

Fig. 1, is placed in a convenient position on a table or other support at a location within the reach of the several flexible hoses. The motor for each bending unit is then mounted on the fixture by bolting the yoke in place and attaching the piston rod to the movable former. The several motors are hydraulically connected into the hydraulic system by attaching the couplings 123 to couplings 122. The preferred or necessary sequence of operation of the fixture is known and the units are connected to operate in that sequence. In the fixture shown, the unit *a* is connected to the valve 64. The second unit to operate is connected to the next used valve to operate and so on. In the particular fixture illustrated, there are only three units and a desired timing of the operation of the units is obtained by connecting unit *a* to the first valve to operate; by connecting unit *b* to the fourth valve and by connecting unit *c* to the sixth valve. Thus there is a greater time factor between the operation of unit *a* and unit *b* due to the fact that valves 65 and 66 are skipped. Also there is a time lag between the operation of unit *b* and unit *c* because valve 68 is skipped. The valve box illustrated has six valves and, therefore, a bending fixture with six units may be employed; or as illustrated, a fixture with units fewer than six. Where the valves are not employed, such as valves 65, 66 and 68, there is no coupling made; in other words, the connector 123 is not used with the result that the passages 122 and 121 for that valve are closed.

An operator now places a length of tube in a position as illustrated in Fig. 1, and then may cause a movement of the four-way valve introducing hydraulic medium into the cylinder 57 through line 56 and connecting the opposite end of the cylinder through line 60 to the return line 59. The piston 80 will advance rocking the shaft 86 counter-clockwise and the several cams operate the valves in sequence, to first operate the unit *a*, then unit *b*, then unit *c* to form the tube as above described. The sequential operation of the bending units is determined by the relative positions of the cams, and in some instances, the apparatus may be set up so that some bending units operate simultaneously. An example of such a situation is where the work piece tube is to be bent in such a way that it may be desirable to first grip or bend a central portion thereof and then make bends in parts on opposite sides of the central portion.

The operator then causes the four-way valve to be shifted back to the position shown in Fig. 2 and hydraulic medium is introduced into the cylinder 57 through line 60 while the opposite end of the cylinder is connected to the return line through line 56, and the motors retract the formers in reverse order.

The operating stroke is controlled as to speed by the throttle valve 61. This controls the discharge of hydraulic medium through the line 60; the check valve prevents discharge through the line 62. By enlarging or ensmalling the passage through the throttle valve 61, the speed of operation can be increased or decreased. On the return stroke, however, hydraulic medium passes freely through the check valve so that there is a rapid return stroke. The return stroke is cushioned or checked by reason of the projecting member 112 entering port 113 (Fig. 11). The work piece is now removed and the new work piece inserted and the operation is repeated.

When a run has been completed on a fixture or, in other words, when a sufficient number of products have been made, the several hydraulic motors are easily and quickly detached from the fixture, the fixture removed, and placed in storage or temporarily laid aside and another fixture is then mounted in position for operation and the motors attached thereto. Accordingly, a large number of fixtures may be used with one hydraulic system. The fixtures are entirely independent of the power means and thus the power means may be in use substantially continuously, whereas an individual fixture is used only from time to time as is necessary to produce what is required of that fixture.

The production is not only much more rapid than can be obtained by hand operated fixtures but the labor is minimized both from the standpoint of physical effort required and time required.

We claim:

1. Apparatus for bending elongated length work comprising a fluid pressure system constructed as a generally complete sub-assembly and including a plurality of fluid pressure motors and means for controllably supplying fluid under pressure thereto; a plurality of interchangeable bending fixtures each constructed as a generally complete sub-assembly and each being adapted to be selectively used with said fluid pressure system, each fixture including means forming a base with a plurality of bending units mounted thereon; readily attachable and detachable means for operably connecting selected motors to the bending units of the selected bending fixture; said bending units being operable by said motors to exert bending forces of predetermined orientation for bending longitudinally spaced portions of the work in predetermined directions, the orientation of bending forces applied by the bending units for any one of said bending fixtures being different from that of others of said fixtures, said fluid pressure system also including valve means operable to actuate said motors in a predetermined sequence.

2. Apparatus for bending elongated length work comprising a fluid pressure system constructed as a generally complete sub-assembly and including a plurality of fluid pressure motors and means for controllably supplying fluid under pressure thereto; a plurality of interchangeable bending fixtures each constructed as a generally complete sub-assembly and each being adapted to be selectively used with said fluid pressure system, each fixture including means forming a base with a plurality of bending units mounted thereon, each unit including an element mounted to rectilinearly reciprocate for applying bending force to work and returning after application of said force, said elements being permanently associated with said bending fixture; readily attachable and detachable means for operably connecting selected motors to the movable elements of the bending units of the selected bending fixture; said movable elements being operable by said motors to exert bending forces of predetermined orientation for bending longitudinally spaced portions of the work in predetermined directions, the orientation of the lines of reciprocation of the units of any one of said bending fixtures being different from that of others of said fixtures.

References Cited in the file of this patent

UNITED STATES PATENTS

| | | |
|---|---|---|
| 37,593 | Seely | Feb. 3, 1863 |
| 237,515 | Gould | Feb. 8, 1881 |
| 653,704 | Scott et al. | July 17, 1900 |
| 736,835 | Flinn | Aug. 18, 1903 |
| 1,867,581 | Marietta | July 19, 1932 |
| 2,318,344 | Urschel | May 4, 1943 |
| 2,329,709 | Fischer | Sept. 21, 1943 |
| 2,348,439 | Peterson et al. | May 9, 1944 |
| 2,355,997 | Mueller et al. | Aug. 15, 1944 |
| 2,497,297 | Court | Feb. 14, 1950 |
| 2,540,323 | Cross et al. | Feb. 6, 1951 |
| 2,612,203 | Smida | Sept. 30, 1952 |
| 2,669,275 | Fenton et al. | Feb. 16, 1954 |